(12) United States Patent
Kondou et al.

(10) Patent No.: US 7,717,204 B2
(45) Date of Patent: May 18, 2010

(54) BUMPER STRUCTURE OF AUTOMOTIVE VEHICLE

(75) Inventors: Kazuma Kondou, Hiroshima (JP);
Naoaki Yamamoto, Hiroshima (JP);
Minoru Ohkubo, Hiroshima (JP);
Hiroshi Yokokura, Hiroshima (JP);
Yoshiatsu Kuga, Hiroshima (JP)

(73) Assignee: Mazda Motor Corporation (JP)

( * ) Notice: Subject to any disclaimer, the term of this patent is extended or adjusted under 35 U.S.C. 154(b) by 154 days.

(21) Appl. No.: 12/013,657

(22) Filed: Jan. 14, 2008

(65) Prior Publication Data
US 2008/0191500 A1    Aug. 14, 2008

(30) Foreign Application Priority Data
Feb. 8, 2007    (JP)    ............... 2007-028827

(51) Int. Cl.
*B60K 11/00* (2006.01)
(52) U.S. Cl. ............ 180/68.1; 180/68.3; 296/193.1
(58) Field of Classification Search ............ 180/68.1, 180/68.2, 68.3, 68.4, 68.6; 296/193.09, 193.1, 296/203.02, 208
See application file for complete search history.

(56) References Cited

U.S. PATENT DOCUMENTS

| | | | | |
|---|---|---|---|---|
| 5,251,712 A | * | 10/1993 | Hayashi et al. ............ | 180/68.3 |
| 5,564,513 A | * | 10/1996 | Wible et al. ............... | 180/68.3 |
| 5,860,685 A | | 1/1999 | Horney et al. | |
| 6,868,928 B2 | * | 3/2005 | Cohen et al. .............. | 180/68.3 |
| 6,880,655 B2 | * | 4/2005 | Suwa et al. ............... | 180/68.1 |
| 7,237,635 B2 | * | 7/2007 | Khouw et al. ............. | 180/68.3 |
| 7,290,630 B2 | * | 11/2007 | Maeda et al. ............. | 180/68.4 |
| 7,469,762 B2 | * | 12/2008 | Kim ......................... | 180/68.1 |
| 2003/0042055 A1 | | 3/2003 | Suwa et al. | |
| 2005/0023057 A1 | | 2/2005 | Maeda et al. | |
| 2005/0230162 A1 | | 10/2005 | Murayama et al. | |
| 2008/0017429 A1 | * | 1/2008 | Palande et al. ............ | 180/68.4 |

FOREIGN PATENT DOCUMENTS

| | | |
|---|---|---|
| JP | 2005 001429 A | 1/2005 |
| JP | 2005-170237 | 6/2005 |
| WO | 2006 070088 A | 7/2006 |

OTHER PUBLICATIONS

Extended European Search Report dated Jan. 29, 2010; Application No. 08000941.8-2421/1955903.

* cited by examiner

*Primary Examiner*—S. Joseph Morano
*Assistant Examiner*—John D Walters
(74) *Attorney, Agent, or Firm*—Studebaker & Brackett PC; Donald R. Studebaker

(57) ABSTRACT

An opening portion is formed at an upper-side portion of a shroud panel so as to penetrate the panel longitudinally. A face member and a face support member form a duct that guides part of outside air coming in through an outside-air intake of the face member to an opening portion of the shroud panel. Accordingly, there can be provided a bumper structure that can properly guide the outside air to an engine room behind the heat exchanger.

10 Claims, 5 Drawing Sheets

BUMPER STRUCTURE OF AUTOMOTIVE VEHICLE

BACKGROUND OF THE INVENTION

The present invention relates to a bumper structure of an automotive vehicle.

A bumper is generally provided at a vehicle front portion of an automotive vehicle. A face member that forms an outer face of the bumper is generally made of a thin resin plate member for the purpose of weight reduction and the like. Accordingly, the face member may have a problem in that it tends to be easily deformed. Japanese Patent Laid-Open Publication No. 2005-170237, for example, discloses a face support member that is provided behind the face member to restrain deformation of the face member as a solution of the above-described problem.

Generally, in the automotive vehicle with en engine room provided at the vehicle front, a heat exchanger (radiator) is provided behind the bumper, and the face member has an outside-air intake that allows outside air to come therethrough toward the heat exchanger. Herein, there is a concern that the outside air that has passed through the heat exchanger and been warmed up by the heat exchanger flows into the engine room, thereby improperly increasing the temperature of the engine room.

Herein, according to the structure disclosed in the above-described patent publication, a grille opening is formed between a front edge of a bonnet hood and an upper edge of the face member in addition to the outside-air intake. The grille opening is located above an upper end of the heat exchanger so that the outside air coming through the grille opening can be supplied to the engine room without passing the heat exchanger. Thereby, the cooling function of the engine room can be improved.

However, there is a case where the heat exchanger is fixed to a vehicle body via a rectangular frame-shaped shroud panel, for example. In this case, the shroud panel is generally disposed in such a manner that there is a very small gap provided between its respective side portions and the vehicle body around them. Accordingly, even if the outside-air is taken in through the grille opening as disclosed in the above-described patent publication, the shroud panel may prevent the outside-air coming through the grille opening from properly flowing down to behind the panel and the heat exchanger.

Further, there may be case where the grille opening can not be provided between the front edge of the bonnet hood and the upper edge of the face member from a design perspective or the like.

SUMMARY OF THE INVENTION

An object of the present invention is to provide a bumper structure that can properly guide the outside air to the engine room behind the heat exchanger.

According to the present invention, there is provided a bumper structure of an automotive vehicle, comprising a face member having an outside-air intake that allows outside air to come therethrough toward a heat exchanger, and a face support member that is provided behind the face member and restrains deformation of the face member, wherein the face member and the face support member form a duct that guides part of the outside air coming in through the outside-air intake of the face member to an opening portion that is formed at an upper-side portion of a rectangular-shaped shroud panel supporting the heat exchanger so as to penetrate the shroud panel longitudinally.

According to the above-described bumper structure, since the opening portion that penetrates the shroud panel longitudinally is formed at the upper-side portion of the shroud panel, the outside air that has not been warmed up by the radiator can be supplied to behind the shroud panel. Herein, since the duct operative to guide the outside air that comes in through the outside-air intake of the face member to the opening portion is formed, the outside air can be properly supplied to the opening portion. Further, since this duct is comprised of the face member and the face support member, any other additional components may not be necessary.

According to an embodiment of the present invention, the opening portion of the shroud panel is the one for supplying the outside air to an air intake portion of an engine, and the duct is configured such that an inlet thereof is offset from the opening portion of the shroud panel in a vehicle width direction. Thereby, in a case where the opening portion of the shroud panel is the one for supplying the outside air to an air intake portion of the engine, since the duct is configured such that its inlet is offset from the opening portion of the shroud panel in the vehicle width direction, any water, such as rain drops, contained in the outside air coming in through the outside-air intake of the face member may be easily attached to an inner face of the duct. Accordingly, trapping of water, such as rain drops, can be properly conducted before reaching the opening portion, so that the engine can be properly protected against the water contained in the outside air.

According to another embodiment of the present invention, a vertical wall portion that forms the duct is provided so as to be substantially perpendicular to a flow direction of the outside air, and a portion of the duct that is located downstream of the vertical wall portion is connected to an upper portion of the vertical wall portion. Thereby, since the vertical wall portion that forms the duct is provided so as to be substantially perpendicular to the flow direction of the outside air, the outside air coming in hits frontally against the vertical wall portion of the duct and thereby any water, such as rain drops, contained in the outside air may be effectively attached to the vertical wall portion. Accordingly, any water, such as rain drops, contained in the outside air may not reach the opening portion more effectively, so the engine can be more properly protected against the water contained in the outside air. Further, even if a relatively large amount of water that is pushed upward by the bumper face and enters through the inlet when a vehicle travels on a road with a rain paddle or something, since the vertical wall portion is formed in the duct, the water may be properly restrained from reaching the opening portion of the upper-side portion of the shroud panel.

According to another embodiment of the present invention, there is provided a bottom face portion that is located downstream of the vertical wall portion of the duct and configured such that a bottom face thereof is located below a lower edge of the opening portion of the shroud panel. Thereby, even if any water, such as rain drops, contained in the outside air may come into the duct, passing through a portion that is perpendicular to the flow direction of the outside air, since there is provided the bottom face portion that is located downstream of the vertical wall portion of the duct and configured such that its bottom face is located below the lower edge of the opening portion of the shroud panel, the water may stay around the bottom face portion without flowing downstream of the opening portion of the shroud panel. Accordingly, any water, such as rain drops, contained in the outside air may not reach the opening portion more effectively, so that the engine can be more properly protected against the water contained in the outside air.

According to another embodiment of the present invention, a wall portion is provided at an upstream-end portion of the bottom face portion. Thereby, since the wall portion is provided at the upstream-end portion of the opening-front portion, any water coming in along the inner face of the duct is prevented from flowing upstream by the wall portion. Accordingly, any water, such as rain drops, contained in the outside air may not reach downstream of the opening-front portion, so that the above-described effect can be achieved more securely. Also, since the water may not flow back upstream even if the water comes in, the water can be prevented from flowing back to the downstream side again.

According to another embodiment of the present invention, a drain hole is formed at the bottom face portion. Thereby since the drain hole is formed at the bottom face portion, the water may be prevented from improperly staying at the bottom face portion.

According to another embodiment of the present invention, a passage leading to an engine room behind the shroud panel is provided outside of the duct and a slit that connects the duct to the passage is provided at the duct. Thereby, since the passage leading to the engine room behind the shroud panel is provided outside of the duct and the slit that connects the duct to the passage is provided at the duct, part of the outside air that comes in from the outside-air intake of the face member flows into the engine room. Accordingly, the cooling function of the engine room is improved.

Other features, aspects, and advantages of the present invention will become apparent from the following description which refers to the accompanying drawings.

DETAILED DESCRIPTION OF THE INVENTION

Figure 1:
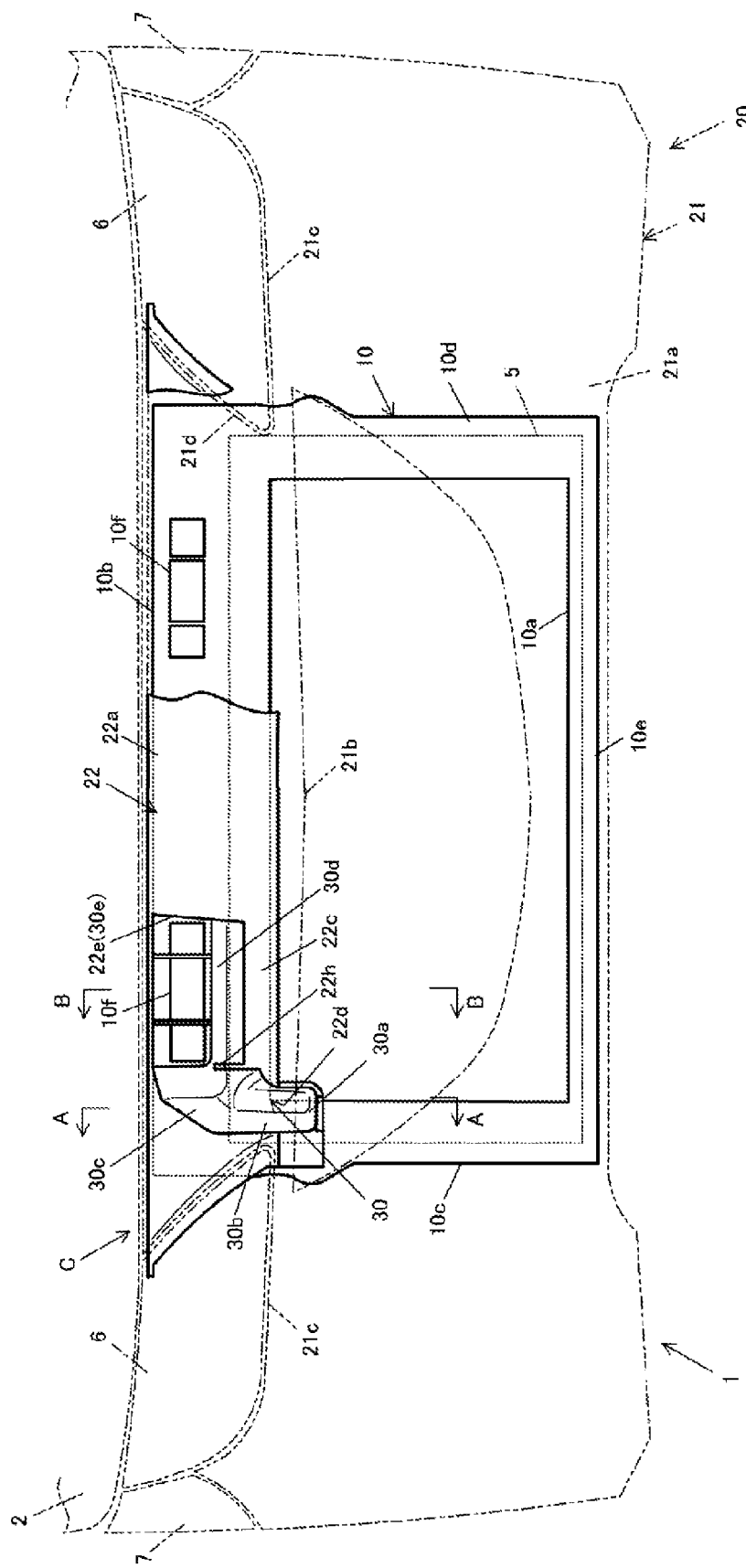
FIG. 1 is an elevation view of a bumper structure of an automotive vehicle according to an embodiment of the present invention.
Figure 2:
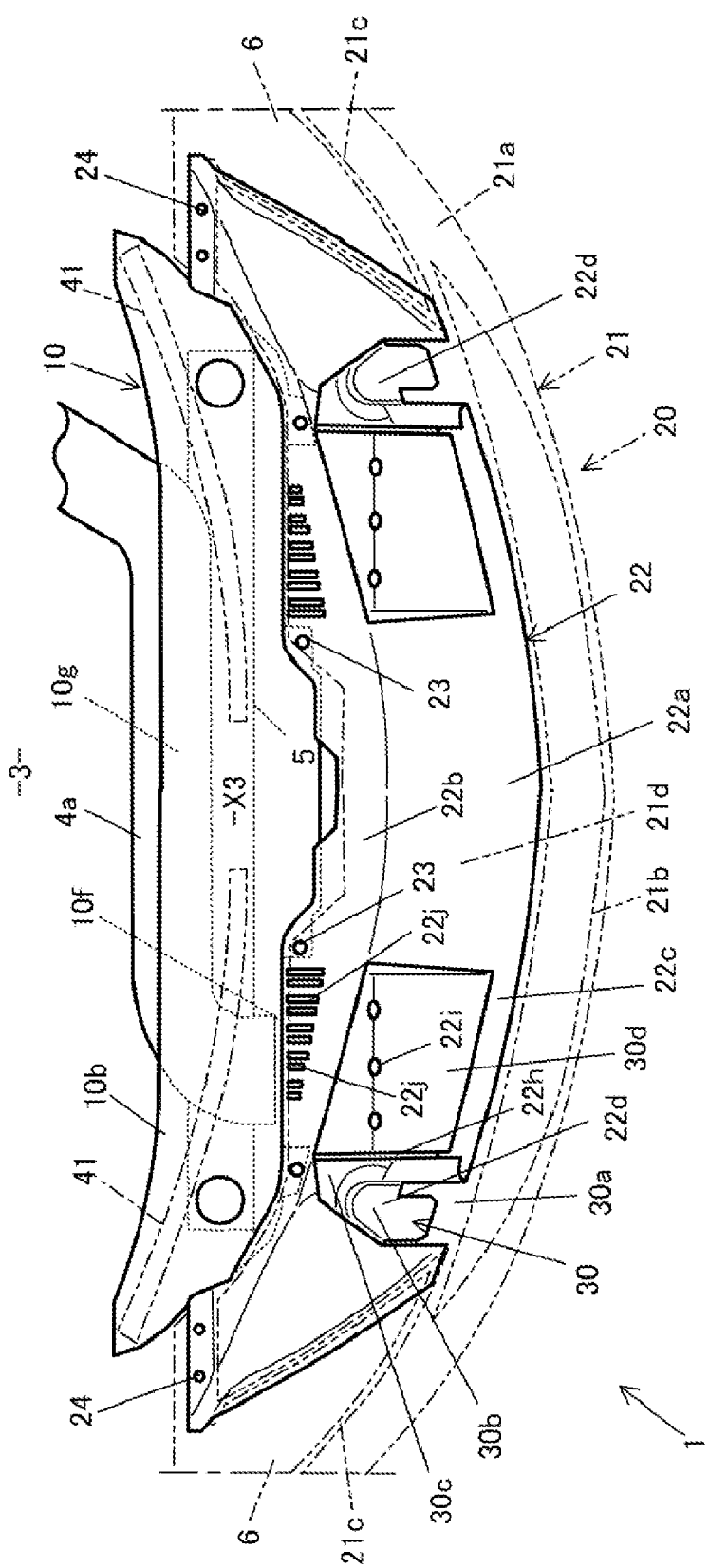
FIG. 2 is a plan view of the bumper structure.
Figure 3:
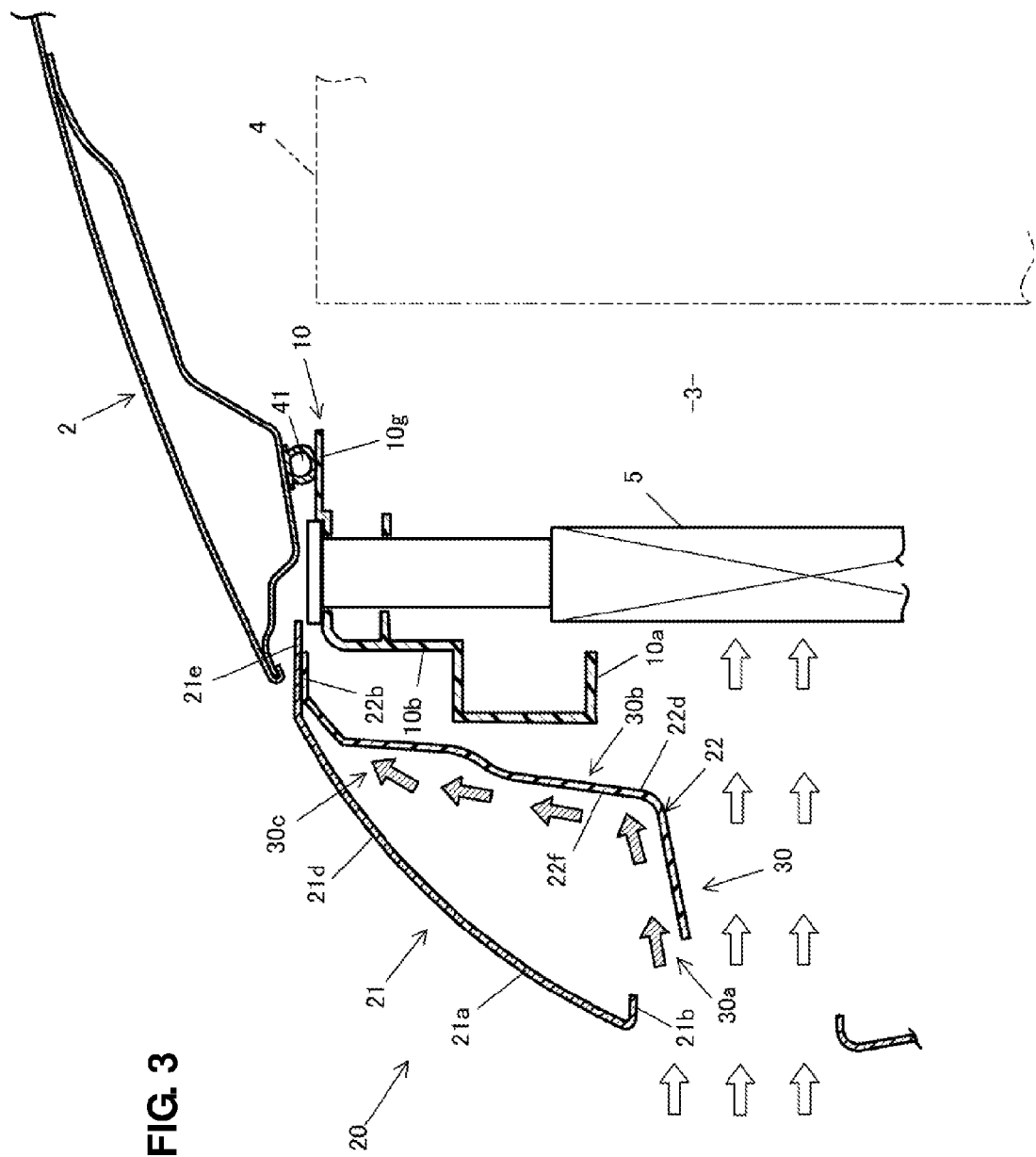
FIG. 3 is a sectional view taken along line A-A of FIG. 1.
Figure 4:
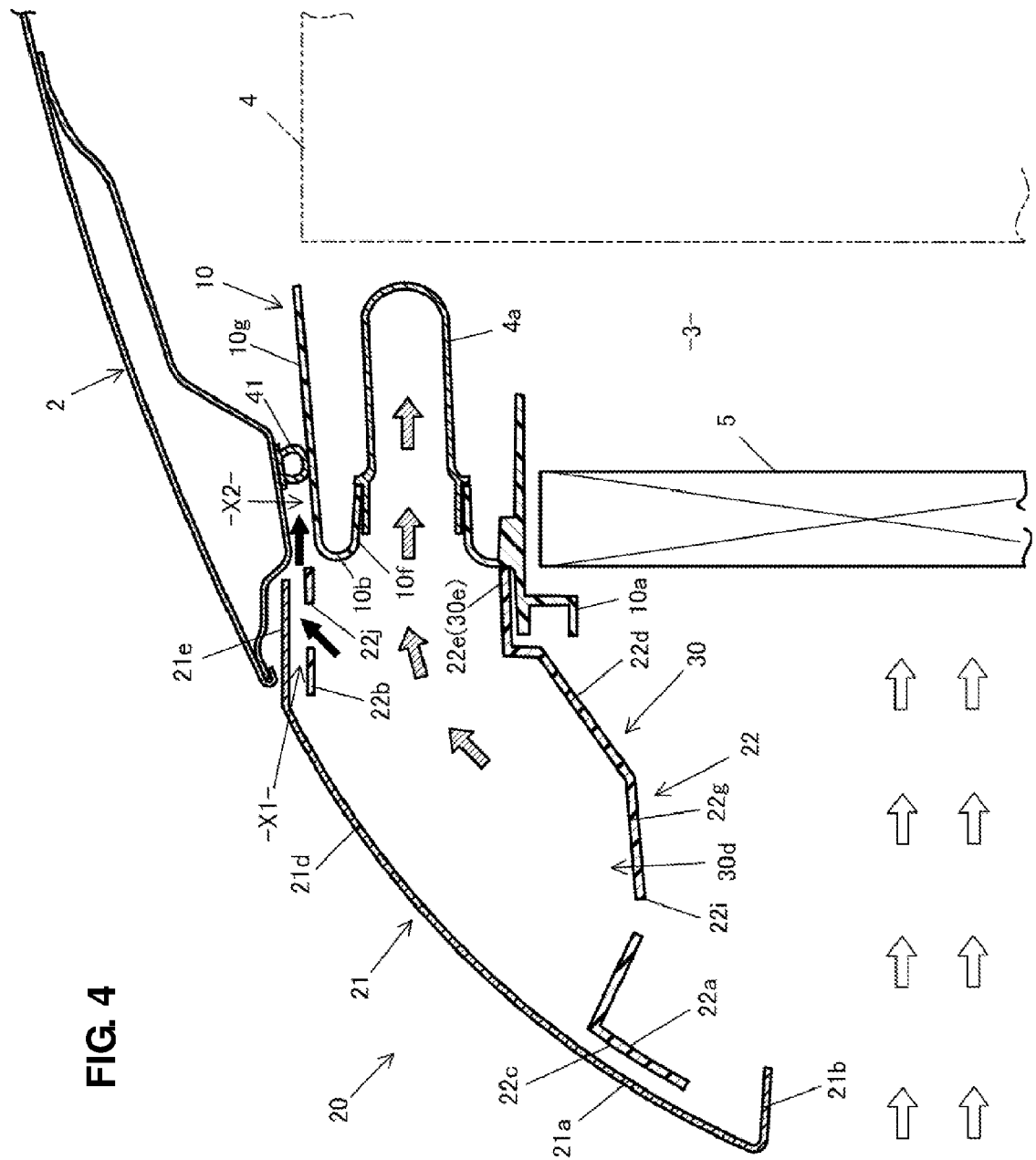
FIG. 4 is a sectional view taken along line B-B of FIG. 1.

A bumper structure of an automotive vehicle according to a preferred embodiment of the present invention will be descried. FIG. 1 is an elevation view of an automotive vehicle 1 according to the present embodiment (part of that is shown by an imaginary line, or as a sectional view). FIG. 2 is a plan view of a front portion of the automotive vehicle 1 (part of that is shown by an imaginary line). FIG. 3 is a sectional view taken along line A-A of FIG. 1, and FIG. 4 is a sectional view taken along line B-B of FIG. 1. As shown in these figures, at the front portion of the automotive vehicle 1 of the present embodiment is provided an engine room 3 that is covered with a bonnet hood 2. An engine 4 is disposed at a central portion of the engine room 3. A radiator (heat exchanger) 5 is supported at a vehicle body at a front portion of the engine room 3 via a frame-shaped shroud panel 10 that has a rectangular central opening portion 10a at a center thereof.

The shroud panel 10, which is made of resin, is fixed to a vehicle-body member, such as vehicle side frames, not illustrated, which comprises an upper-side portion 10b, a left-side portion 10c, a right-side portion 10d, and a lower-side portion 10e. These side portions 10b-10e have a specified width, respectively, and the shroud panel 10 is supported at the vehicle body member with a relatively small distance between the side portions 10b-10e and the vehicle body member so that the shroud panel 10 can provide a properly large rigidity enough to support the radiator 5.

At both sides of the upper-side portion 10a of the shroud panel 10 is formed a pair of opening portions 10f, 10f that penetrate the panel 10 longitudinally. A front end portion of an intake duct 4a of the engine 4 is coupled to the opening portion 10f that is located on the left in the figures.

A bumper 20 that constitutes a front end portion of the vehicle body of the automotive vehicle 1 comprises a face member 21 that forms its outer face and a face support member 22 that restrains deformation of the face member 21.

Specifically, the face member 21, which is made of resin, is of a curve shape such that its central portion in a vehicle width direction protrudes toward a vehicle front. At a central portion of a body portion 21a of the face member 21 is formed an outside-air intake 21b that allows outside air to come therethrough toward the radiator 5. The outside-air intake 21b has a rectangular shape in which its lateral width is relatively longer. An upper end (upper edge) of the face member 21 is located substantially at the same level as an upper end of head lamps 6, 6. The face member 21 has notch portions 21c, 21c at upper both-end portions thereof that are located so as to correspond to the head lamps 6, 6. According to a conventional structure, the upper end of the face member is generally located around at the level of lower end of the head lamps, and between both the lead lamps are provided a front grille opening or the like for an intake of the outside air to the engine room. In the present embodiment, however, the upper end of the face member 21 is disposed at the above-described height and no front grille is provided from a vehicle design perspective.

The face support member 22, which is provided to restrain the deformation of the face member 21 that may be caused by an outer force and the like, has a body portion 22a that is of a reverse-trapezoid shape, which is similar to a shape of a portion 21d of the face member 21 that is located above the outside-air intake 21b between the head lamps 6, 6. The body portion 22a of the face support member 22 is located so as to overlap the portion 21d of the face member 21.

The face member 21 and the face support member 22 respectively include attachment-face portions 21e, 22b that are provided along upper end edges of the body portions 21a, 22a so as to extend substantially horizontally. Part of these attachment-face portions 21e, 22b are fixed to an upper face portion 10g of the upper-side portion 10b of the shroud panel 10 via plural bolts 23 . . . 23.

Further, a lower edge portion of the face member 21 is fixed to an under cover, not illustrated, that is disposed behind the face member 21, and both-side end portions of the face member 21 are fixed to front end portions of the both-side fenders 7, 7.

Meanwhile, both-side end portions of the attachment-face portion 22b of the face support member 22 are fixed to a vehicle body, not illustrated, along with vehicle-body-side attachment portions of the head lamps 6, 6 via plural bolts 24 . . . 24.

Between the body portion 21a of the face member 21 and the body portion 22a of the face support member 22 is provided a specified gap in the above-described fixing state. Herein, the gap is set to be about 2-3 mm, for example, which may be set by considering measure tolerance, setting position tolerance, thermal extension/shrinking of the members 21, 22 or the like. Meanwhile, in a case where the face member 21 is slightly deformed rearward by receiving an air pressure acting on the face member 21 or the like at a vehicle traveling, for example, the body portion 21a of the face member 21 may come to contact the body portion 22a of the face support member 22 (including an indirect contact via a shock absorbing material of urethane or the like), so that the further deformation of the face member 21 can be restrained.

Figure 5:
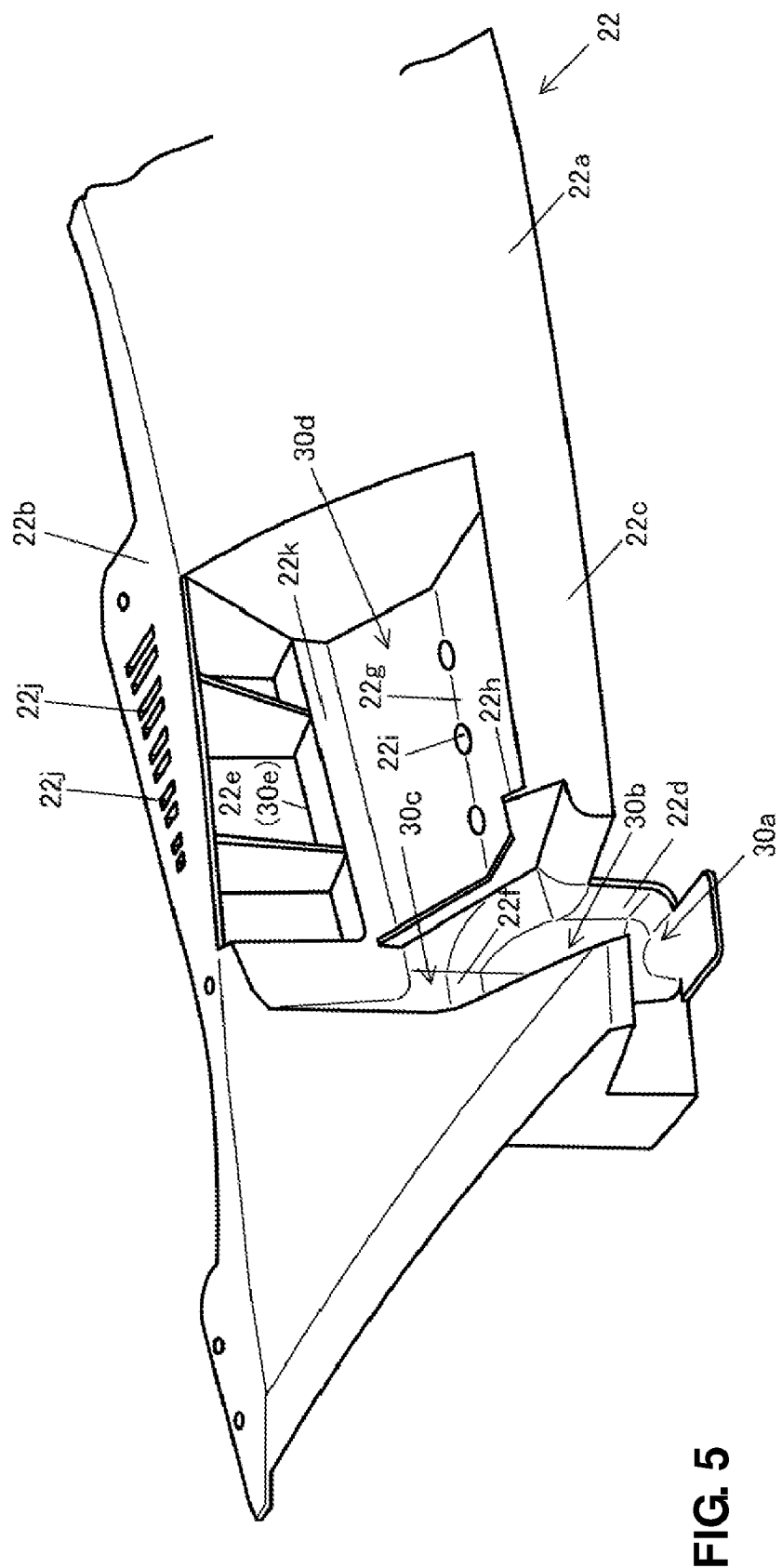
FIG. 5 is a perspective view a bumper support member, when viewed in an arrow C direction in FIG. 1.

Herein, as shown in FIG. 5, the body portion 22a of the face support member 22 has groove portions 22d, 22d that are formed so as to be recessed rearward from a base face 22c of the body portion 22a at a location that corresponds to both-side end portions of the outside-air intake 21b. The groove portion 22d is located below an upper edge of the outside-air intake 21b in such manner that its lower end is exposed to the outside-air intake 21b of the face member 21 in an elevation view. The groove portion 22d is configured so as to extend upward, then bends inwardly at about the same level position as the opening portion 10f of the shroud panel 10, and leads to a position in front of the opening portion 10f. Herein, the width (in the vehicle width direction) of the groove portion 22d at the position in front of the opening portion 10f is about the same as that of the opening portion 10f. Further, at a rearward wall portion 22k that is formed so as to extend vertically is formed an opening portion 22e that is slightly larger than the above-described opening portion 10f.

In this case, the groove portion 22d is covered with the body portion 21a of the face member 21 from the vehicle front (the slight gap exits as described above). Accordingly, the face member 21 and the groove portion 22d of the face support member 22 form a duct 30, in which an inlet 30a (the groove portion 22d below the upper edge of the outside-air intake 21b of the face member 21) is exposed to the outside-air intake 21b, an upward extending portion 30b extends upward from the inlet 30a, a bending portion 30c bends inwardly at about the same level position as the opening portion 10f of the shroud panel, and an opening-front portion 30d is located in front of the above-described opening portion 10f so as to lead to an outlet 30e (opening portion 22e). Thus, part of the outside air coming through the outside-air intake 21b of the face member 21 can be guided to the opening portion 10 of the upper-side portion 10b of the shroud panel 10 via the above-described duct 30.

Herein, the duct 30 is configured such that the inlet 30a is offset from the outlet 30e, namely the opening portion 10f of the shroud panel 10, in the vehicle width direction and vertically.

Further, at the groove portion 22d of the face support portion 22 is formed a vertical wall portion 22f that extends substantially vertically so as to be substantially perpendicular to a flow direction of the outside air coming in from the inlet 30a. A portion of the duct 30 that is located downstream of the vertical wall portion 22f is connected to an upper portion of the vertical wall portion 22f.

Also, the opening-front portion 30d (a bottom face portion) is configured such that a bottom face 22g is located below the lower edge of the opening portion 10f of the shroud panel 10.

Further, a wall portion 22h is provided at an upstream-end portion of the opening-front portion 30d so as to extend in a vehicle longitudinal direction. At the bottom face 22g of the opening-front portion 30d are formed a few through holes (drain holes) 22i . . . 22i that penetrate vertically the bottom face 22g.

Also, the lower face of the bonnet hood 2 and the upper face portion 10g of the upper-side portion 10b of the shroud panel 10 are set so as to provide a specified gap therebetween in the vertical direction. Weather seals 41, 41 are attached to a lower face of a front edge portion of the bonnet hood 2 at its both sides except a central portion. A plurality of slits 22j . . . 22j are provided at the attachment face portion 22b of the face support member 22 in front of the opening-front portion 22e so as to extend in the vehicle longitudinal direction. Herein, at a range of provision of the slits 22j . . . 22j at the attachment face portion 22b, there exists a gap space X1 vertically between the attachment face portion 21e of the face member 21 and the attachment face portion 22b of the face support member 22. This gap space X1, a gap space X2 provided between the lower face of the bonnet hood 2 and the upper face portion 10g of the upper-side portion 10b of the shroud panel 10, and a space X3 provided between the both-side weather seals 41, 41 form a passage that interconnects the engine room 3 and the duct 30.

Hereinafter, the function of the present embodiment will be described.

First, according to the bumper structure of the present embodiment, the outside air comes in from the outside-air intake 21b of the face member 21 of the bumper 20, as shown by white (no-hutching) arrows of FIGS. 3 and 4, and it is supplied to the radiator 5 (heat exchanger).

Further, since the opening portions 10f that penetrates the panel 10 longitudinally is formed at the upper-side portion 10a and the face member 21 and the face support member 22 form the duct 30 that extends from the outside-air intake 21b to the opening portion 10f, part of the outside air coming in from the outside-air intake 21b of the face member 21 is guided to the opening portion 10f as shown by dark (with hutching) arrows. Thereby, the outside air that has not been warmed up by the radiator 5 (heat exchanger) can be supplied behind the shroud panel 10. Herein, since the duct 30 is substantially comprised of the face member 21 and the face support member 22, any other additional components may not be necessary.

Also, since the duct 30 is configured such that the inlet 30a is offset from the outlet 30e, namely the opening portion 10f of the shroud panel 10, in the vehicle width direction in a case where the opening portion 10f (left side) of the shroud panel 10 is the one for supplying the outside air to the intake duct 4a of the engine 4, any water, such as rain drops, contained in the outside air flowing down the duct 30 may be easily attached to the inner face of the duct 30. Accordingly, trapping of water, such as rain drops, can be properly conducted before reaching the opening portion 10f, so that the engine 4 can be properly protected against the water contained in the outside air.

Further, since the vertical wall portion 22f that forms the duct 30 is provided so as to be substantially perpendicular to the flow direction of the outside air, the outside air coming in hits frontally against the vertical wall portion 22f of the duct and thereby any water, such as rain drops, contained in the outside air may be effectively attached to the vertical wall portion 22f. Accordingly, any water, such as rain drops, contained in the outside air may not reach the opening portion 10f more effectively, so that the engine 4 can be more properly protected against the water contained in the outside air. Further, even if a relatively large amount of water that is pushed upward by the face 21 and enters through the inlet 30a when a vehicle travels on a road with a rain paddle or something, since the vertical wall portion 22f is formed in the duct 30, the water may be properly restrained from reaching the opening portion 10f of the upper-side portion 10b of the shroud panel 10.

Also, even if any water, such as rain drops, contained in the outside air may come into the duct 30, passing through a portion of the vertical wall portion 22f, since the opening-front portion 30d that is located downstream of the vertical wall portion 22f of the duct 30 is configured such that the bottom face 22g is located below the lower edge of the opening portion 10f of the shroud panel 10, the water may stay around the opening-front portion 30d without flowing downstream of the opening portion 10f of the shroud panel 10. Accordingly, any water, such as rain drops, contained in the outside air may not reach the opening portion 10f more effectively, so that the engine 4 can be more properly protected against the water contained in the outside air.

Further, since the wall portion 22h is provided at the upstream-end portion of the opening-front portion 30d so as to extend in the vehicle longitudinal direction, any water coming in along the inner face of the duct 30 is prevented from flowing upstream by the wall portion 22h. Accordingly, any water, such as rain drops, contained in the outside air may not reach downstream of the opening-front portion 30d, so that the above-described effect can be achieved more securely. Also, since the water may not flow back upstream even if the water comes in, the water can be prevented from flowing back to the downstream side again.

Also, since the through holes (drain holes) 22i . . . 22i are formed at the bottom face 22g of the opening-front portion 30d, the water may be prevented from improperly staying at the opening-front portion 30d.

Further, since the passages (spaces X1-X3) leading to the engine room 3 behind the shroud panel 10 are provided outside of the duct 30 and the slits 22j . . . 22j that connect the duct 30 to the passages are provided at the duct 30, part of the outside air that comes in from the outside-air intake 21b of the face member 21 and flows down the duct 30 flows into the passages (spaces X1-X3) through the slits 22j . . . 22j and then comes into the engine room 3 via these passages (spaces X1-X3), as shown arrows (bold line). Accordingly, cooling function of the engine room 3 is improved.

While the duct 30 is configured such that the inlet 30a is offset from the shroud panel 10 both in the vehicle width direction and in the vertical direction in the elevation view of the present embodiment, it may be configured such that the inlet 30a is offset from the shroud panel in either one of the above-described directions. In this case, likewise, any water, such as rain drops, contained in the outside air may be easily attached to the inner face of the duct, so that the engine can be properly protected against the water.

Further, while descriptions of the duct 30 to guide the outside air to the right-side opening portion 10f for the intake duct 4a of the engine 4 has been mainly explained, the other duct 30 for the left-side opening portion 10f has the same structure so that the outside air coming in the right-side opening portion 10f through the right-side duct 30 can be supplied to the engine room 3 behind the radiator 5. Accordingly, the engine 5 and the transmission are properly cooled by the outside air that has not warmed up by the radiator 5. In a case where other components, such as a battery, a charger, an alternator, a control unit, are disposed behind the right-side opening portion 10f, these can be properly cooled by the outside air that has not warmed up by the radiator 5 as well.

The present invention should not be limited to the above-described embodiment, and any other modifications and improvements may be applied in the scope of a sprit of the present invention.

What is claimed is:

1. A bumper structure of an automotive vehicle, comprising:
    a face member having an outside-air intake that allows outside air to come therethrough toward a heat exchanger; and
    a face support member that is provided behind the face member and restrains deformation of the face member,
    wherein the face member and the face support member form a duct that guides part of the outside air coming in through the outside-air intake of the face member to an opening portion that is formed at an upper-side portion of a rectangular-shaped shroud panel supporting the heat exchanger so as to penetrate the shroud panel longitudinally,
    wherein said face member has the outside-air intake for the heat exchanger at a central portion thereof and a pair of lamp-corresponding portions at both-end portions thereof,
    said face support member has a body portion behind a portion of the face member that is located above said outside-air intake between said lamp-corresponding portions,
    said body portion of the face support member has a groove portion that is formed so as to be recessed rearward from a base face of the body portion at a location corresponding to a side end portion of the outside-air intake of the face member,
    said groove portion of the body portion has a lower end that is exposed to the outside-air intake of the face member in an elevation view, a passage portion that extends upward from the lower end and then bends inwardly, and an opening portion that is located at a position in front of said opening portion formed at the upper-side portion of the shroud panel, and
    said duct formed by the face member and the face support member comprises an inlet that is formed at said lower end of the groove portion behind the face member, an upward extending portion and a bending portion that are formed at said passage portion of the groove portion behind the face member, and an opening-front portion that is formed at said opening portion of the groove portion behind the face member so as to lead to the opening portion formed at the upper-side portion of the shroud panel.

2. The bumper structure of an automotive vehicle of claim 1, wherein said opening portion of the shroud panel is the one for supplying the outside air to an air intake portion of an engine, and said duct is configured such that the inlet thereof is offset from the opening portion of the shroud panel in a vehicle width direction.

3. The bumper structure of an automotive vehicle of claim 2, wherein said passage portion of the groove portion of the body portion comprises a vertical wall portion that is provided so as to be substantially perpendicular to a flow direction of the outside air, and a laterally-extending portion that is located downstream of the vertical wall portion.

4. The bumper structure of an automotive vehicle of claim 3, wherein said laterally-extending portion of the groove portion of the body portion has a bottom face that is located below a lower edge of the opening portion of the shroud panel.

5. The bumper structure of an automotive vehicle of claim 4, wherein a wall portion is provided at an upstream-end portion of the bottom face portion.

6. The bumper structure of an automotive vehicle of claim 4, wherein a drain hole is formed at the bottom face portion.

7. The bumper structure of an automotive vehicle of claim 1, wherein a passage leading to an engine room behind the shroud panel is provided outside of the duct and a slit that connects the duct to the passage is provided at the duct.

8. The bumper structure of an automotive vehicle of claim 1, wherein said body portion of the face support member is provided behind said face member with a specified gap.

9. The bumper structure of an automotive vehicle of claim 1, wherein said face member and said face support member are fixed to said upper-side portion of the shroud panel together.

10. The bumper structure of an automotive vehicle of claim 1, wherein said face member is formed in a curve shape such that the central portion thereof protrudes forward in a plan view.

* * * * *